Sept. 29, 1953  J. T. ABDO  2,654,039
ELECTRIC MOTOR LAMINATED STATOR CONSTRUCTION
Filed Feb. 21, 1952
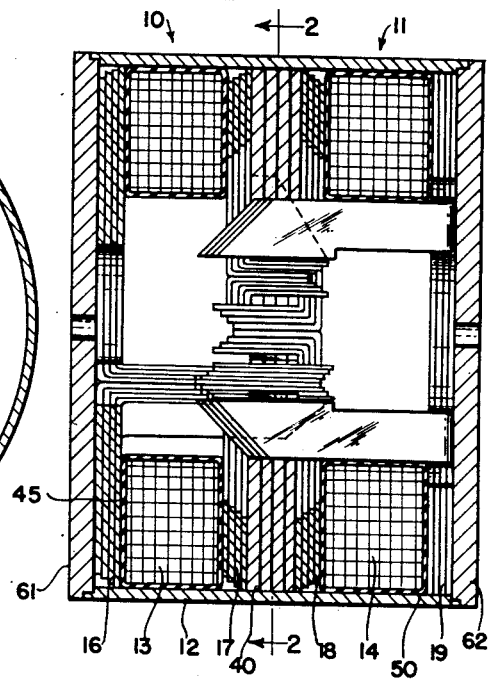
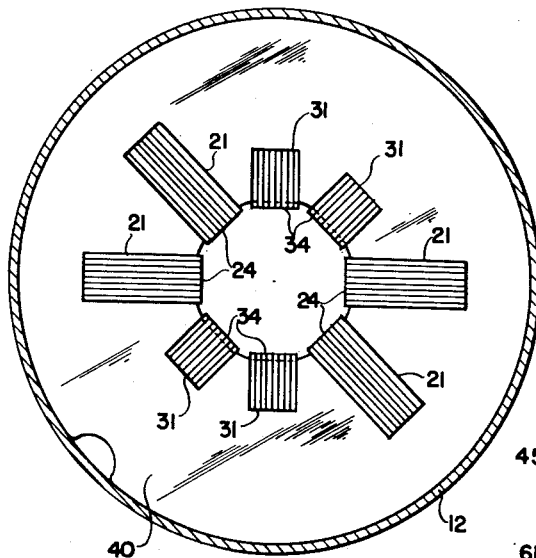
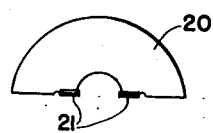
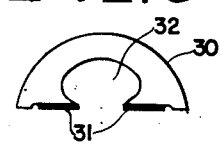
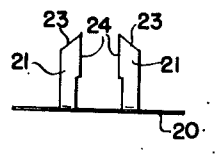
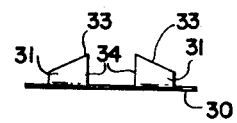
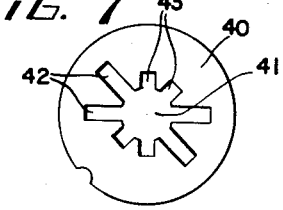
*INVENTOR.*
JOSEPH T. ABDO
BY
*George H. Fisher*
ATTORNEY Patented Sept. 29, 1953

2,654,039

UNITED STATES PATENT OFFICE 2,654,039

ELECTRIC MOTOR LAMINATED STATOR CONSTRUCTION

Joseph T. Abdo, Robbinsdale, Minn., assignor to Minneapolis-Honeywell Regulator Company, Minneapolis, Minn., a corporation of Delaware Application February 21, 1952, Serial No. 272,829

12 Claims. (Cl. 310—258)

My invention relates to electric motors and more particularly to the design of a laminated type of magnetic field element or stator and to a type of laminated construction having application in small compact magnetic circuits.

While the laminated type of construction is generally old in relationship to magnetic circuits, and in particular to electric motor designs, it generally requires accurate means for holding the laminations in assembled relationship, fairly accurate dimensioning of the laminations and special methods for handling and assembling such parts. The present invention is directed toward a type of magnetic circuit construction which uses a simple lamination form with no high degree of dimensional tolerance, thus being simple and economical to manufacture, one which may be readily assembled without special handling procedures or machines for assembly and maintained in assembled relationship without special retaining means. This lamination construction is particularly adaptable to small motor designs of the single phase or two phase type wherein a single energizing coil is utilized for each phase of energization.

Therefore, it is an object of this invention to provide an improved type of laminated magnetic field element or stator which is simple and economical to manufacture and maintain.

This and other objects of this invention will become apparent from the reading of the attached description together with the drawings in which:

Figure 1 is a sectional view of a two phase or split phase alternating current electric motor utilizing the improved magnetic field element construction, Figure 2 is a sectional view of the motor design of Figure 1, taken along the line 2—2, Figures 3—4 and 5—6 are plan and side elevation views respectively of the two types of laminations used in my improved design of the magnetic field element, and Figure 7 is a plan view of the non-magnetic support member which holds the pole extremities of the laminations in their assembled relationship.

The improved laminated magnetic field structure construction of the subject invention is shown herein in connection with a two phase alternating current type of motor similar to that disclosed in the Morrill Patent 2,070,447 dated February 9, 1937. It will be seen, however, that this type of field construction will also be applicable to an alternating current motor design utilizing a single field element and a single energizing winding, such as of the type shown in the Kronmiller et al. Patent 2,583,180. In motor designs of the types shown by these patents, the magnetic circuit generally consists of a single sheet or thickness of metal which is stamped to form the yoke and pole portions of the field structure which are generally of such thickness that it is difficult to get sufficient iron in the magnetic circuit without requiring special and large machinery for performing the stamping operations. With the present construction it will be seen that the lamination thickness is very thin and simple such that it may be readily manufactured or formed and yet may be assembled in any desired quantity to form a magnetic circuit of any desired thickness without special equipment for performing the assembling operation.

Referring now to Figure 1 it will be seen that the subject motor design consists of two magnetic field elements numbered 10 and 11 mounted in a cylindrical housing of magnetic material indicated 12 in an opposed tandem relationship. Each of the field elements 10 and 11 are identical in construction employing a single energizing winding 13, 14 respectively and positioned between pole piece structures 16 and 17, 18 and 19. It will be understood that for the most part the coils 13 and 14 are identical, and the laminations going to make up the pole structures 16 and 19 and the pole structures 17 and 18 are symmetrical or identical with one another respectively. The lamination for the pole piece structures indicated 16 and 19 is shown in Figures 3 and 4. This lamination comprises a semi-circular yoke portion 20 with a pair of pole portions 21 extending from the extremities thereof normal or transverse of the plane of the yoke portion. In construction, the pole portions 21 are usually bent during the stamping operation. As will be seen in Figure 4, the extremity of the pole portions 21 are beveled or pointed as at 23, the pole portions being identical in form and having a slightly offset surface from the remainder of the pole portion at 24 the side surface of which when combined with other laminations will make up the pole face for the pole formed by the laminations. Pole portions 21 midway along their extent have a slight bend or curve therein the purpose of which will become evident as the disclosure proceeds. The pole piece structures 17 and 18 utilize the lamination shown in Figures 5 and 6, these laminations being substantially the same as that utilized in 16 and 19 with the exception the pole portions are of shorter extent. These laminations also have a yoke portion 30 which is semicircular in form and includes at their extremities a pair of pole portions 31 bent normal to the yoke 30 and having a semi-circular opening 32 therebetween. The extremities of the pole portions 31 are also tapered as at 33 and have a surface indicated at 34 which combine with similar surfaces on the other laminations when the motor is assembled to provide the pole face for these short poles. It will also be noticed that the width of the pole portion 31 is slightly larger than the width of pole portion 21 of the laminations going to make up the pole piece structures 16 and 19. In Figures 2 and 7 there are also shown a plurality of non-magnetic frame or support members 40 having a circular opening 41 therein and a plurality of radially extending slots 42, 43 extending from the circular opening 41. Support members 40 may be made out of any suitable non-magnetic material. It has been found that even current conductive non-magnetic materials may be used for members 40. However, in view of modern manufacturing procedures, members 40 are preferably made out of a suitable plastic material. The slots 42 are of greater depth than the pair of slots 43, the slots 42 being designed to hold the pole portions 31 of the short pole laminations of the structures 17 and 18 and the narrow depth slots 43 holding the long narrow pole portions 21 of the pole piece structures 16 and 19. The slots are positioned at 45 degree points about the periphery of the aperture 41 in the support member, the longer slots 42 being spaced at 45 degree angle relationship to one another and the shorter slots midway therebetween, this as will be later noted, giving a 90 degree space displacement between a pair of long and a pair of narrow slots supporting the poles energized from one coil with the same depth slot at diametrically opposed positions. In assembling the motor, the support members 40 may be positioned within the magnetic frame member 12 and suitably held by means not shown therein. Next four pairs of the laminations going to make up one of the field structures 17 or 18 will be inserted from one surface of the support members 40 with the poles extending through the support members and fitting into one pair of the large slots 42, the laminations being placed in paired relationship such that each pair completes the circular form and engages at the various points on its periphery magnetic frame member 12. The assembly of the laminations in the support member is relatively simple in that the laminations are threaded into the support member in pairs and pounded or forced into place with any suitable means to be securely held by the support member at the pole piece portions. When assembled two poles will be formed at the support members disposed 180 degrees from one another and each pole consisting of a lamination thickness of eight laminations, four laminations to either side of a line drawn through the centers of the poles. Next the preformed winding 13 with a suitable insulation indicated at 45 wrapped thereon is placed adjacent the yoke formed by the yoke portions 30 of these laminations. Additional insulating or protecting covering may be added to the winding to fit it into the magnetic frame and adjacent the pole piece structure 17 if necessary. The laminations making up the pole piece structure 16 are then inserted, with the pole piece portions 21 disposed at 90 degree relationship with the pole piece portions 31 of the structure 17 and threading into one pair of the narrow slots indicated at 43. These laminations are also assembled in pairs, eight laminations being utilized to complete the pole piece structure 16 and so assembled that the yoke portions 20 engage at various points on their periphery the magnetic frame member 20. The same procedure is followed in assembling the field element 11, the short pole laminations making up the pole piece structure 18 being inserted with the poles extending toward the field element 10 and with the poles displaced 45 degrees from the poles of the pole piece structure 17 and positioned in the second pair of wide radial slots 42. The pole piece portions 31 and 21, as previously noted, were all slightly bent along their extent and when assembled, this bending and flexibility of the pole piece structure provides for ease in threading the pole piece portions into the slots of the support member and assuring that the laminations will contact one another without requiring a high degree of tolerance in their thickness to provide for holding the laminations making up the pole securely within the slot designed to receive the same. Also, the pole piece portions 21 and 31 of the laminations were provided with pointed extremities at 23, 33 respectively to aid in the assembly such that these tip portions may be easily inserted into the slots in the support structure 40 and to aid in guiding the individual laminations into assembled or nested relationship with one another. The coil 14 is also wound with a suitable insulating and protective covering such as at 50 and the pole piece structure 19 is assembled in the same manner as the pole piece structure 16, the yoke portions of the laminations being positioned in the magnetic frame to engage at points on their periphery the magnetic frame member and the pair of poles formed by the laminations being inserted to a pair of the short slots 43 and at a 90 degree displaced relationship from the poles formed by the pole face structure 18 and 45 degrees displaced from the poles formed by the pole piece structure 16.

Another method of assembly of the motor than that referred to above has been found practical and simple, this method comprising the mounting of the support members 40 on a mandril (not shown) of a diametrical dimension equal to the cylindrical aperture 41 therein and positioning the laminations going to make up the pole piece structures 17, 18, and 16, 19 in the slots of support members 40 such that the pole face portions 24 and 34 are positioned equally within the slotted members 40. The areas between the yokes of the pole piece structures 16, 17 and 18, 19, that is the extent of the pole portions 21 of the lamination extending therebetween, are wrapped or enclosed by a cylindrical shaped insulating member also not shown with suitable insulating material placed adjacent the respective yokes and the windings are wound on the insulating member and between the yokes in the same winding operation. The windings are then covered with suitable insulating material and the assembled field elements placed in the cylindrical frame member after which the mandril is withdrawn from the aperture 41 of the support member. This method of assembly gives the same structure as that described above with the cylindrical support upon which the winding is wound and the side insulations being equivalent to the insulation wrapped on the preformed windings.

The motor design herein may utilize a conventional squirrel cage type of rotor element not shown which would be carried by a shaft suitably supported through bearings also not shown in a pair of end covers 61, 62 which fit into the magnetic frame 12 and enclose the field elements.

It will be seen in the construction of the improved magnetic field element that the bending of the individual pole laminations or pole piece portions of the laminations and the pointing of the same aid in positioning and retaining the laminations within the slots in the support member 40 designed to receive the same. It will also be noted that the aperture 32 in the short pole laminations or yoke portions 30 provide passage for the pole portions 21 of the long pole laminations as they thread into the support members 40. Once the field element is assembled, the pole surfaces or faces made up of a plurality of surfaces 24 and 34 respectively of the poles are machined such that they provide a cylindrical aperture within which the rotor for the field element may be positioned. The disclosure in Figure 2 shows the field element before such machining it being understood that the pole surfaces may be suitable ground or turned on a lathe to provide for the cylindrical aperture. It should also be noted that the particular radial dimensions of the poles is of no importance, and the pole dimensions differ herein merely to distinguish between the long and short poles and aid in the assembly of the device. The dimensions of the pole piece portions 21 are limited to some extent by the diamtrical dimensions of the windings 13. It will also be understood that other types of rotor elements than a squirrel cage unit may be utilized with this field structure. Further it will be understood that an electric motor utilizing a single coil or a single phase motor may be built with this construction and any number of poles may be employed in the device. Specifically if an 8 pole single coil field unit motor is desired, individual laminations for both long and short poles will employ the same arrangement of yoke and pole piece portions, but the yoke portions will be limited to approximately 90 degrees sector of the circular area covered by the yoke of the pole piece structure and four poles will emanate from this pole piece structure, the pole piece extremities of each lamination going to make up different yet consecutive poles. It will also be evident that any number of laminations or thicknesses of laminations may be utilized to make up the poles. Thus it will be seen that any desired pole relationship may be obtained with this type of construction and for any arrangement, the width of the pole will be made up of an equal number of pole piece portions from adjacent laminations. A single phase motor so constructed would be of a non-selfstarting type unless shading means were provided in addition to the structure recited herein.

The motor shown herein would generally be energized so that each winding would be connected to separate phases of a two phase source or one winding would be connected directly to a single phase source and the other winding from the single phase source through a phase shifting device such as a condenser. This arrangement is conventional and may be seen in the above named Morrill patent.

In considering this invention, it should be kept in mind that this disclosure is intended to be illustrative only and the scope of the invention is to be determined by the appended claims.

I claim as my invention:

1. In an alternating current motor, a cylindrical frame member of magnetic material, a stator member positioned within said cylindrical frame member and comprised of an annular energizing winding with an aperture therethrough and a pair of pole piece structures positioned respectively to either end of said annular energizing winding in intimate magnetic association therewith and contacting said cylindrical frame member, each of said pole piece structures of said stator member being formed of a plurality of identically shaped flat laminations having a yoke portion and a pair of pole piece portions extending transversely thereto, said laminations of each pole piece structure being assembled in a plurality of pairs such that the yoke portions of each pair of laminations lie in substantially the same plane and engaging the periphery of the cylindrical frame member and with the pole piece portions disposed in a parallel relationship adjacent one another to form a plurality of poles common to one end of said winding and extending in the same direction to one side of said winding being interposed equi-distantly between poles formed by the pole portions of the laminations of the pole piece structure common to the opposite end surface of said winding, a slotted support member of non-magnetic material positioned within said cylindrical frame and adjacent one end of said winding receiving the poles formed by said pole piece portions of the laminations of said pole piece structures to position the same with a cylindrical opening between said poles, and means for supporting an inductor element within said cylindrical opening.

2. In an alternating current motor, a cylindrical frame member of magnetic material, a stator member positioned within said cylindrical frame member and comprised of an annular energizing winding with an aperture therethrough and a pair of pole piece structures positioned respectively to either end of said annular energizing winding in intimate magnetic association therewith, each pole piece structure of said stator being formed of an even number of identical flat laminations having a yoke portion and pole portions at the extremity thereof extending transversely thereto, said laminations of each pole piece structure being assembled in a plurality of pairs such that the yoke portions of each pair of laminations lie in substantially the same plane being adjacent at their outer periphery to said frame and with the pole portions disposed in a parallel relationship adjacent one another to form a plurality of poles common to one end of said coil with the pole portions of one of said pole piece structures extending through the aperture in said winding and to one side of said winding being interposed equi-distantly between the poles formed by the pole portions of the pole piece structure common to the opposite end surface of said winding, a slotted support member of non-magnetic material supported by said frame member adjacent one end of said winding and receiving the poles formed on said pole structures to position the same with a cylindrical opening therebetween, and means for supporting a rotor within said cylindrical opening for rotation of said rotor therein.

3. In an alternating current motor, a frame member of magnetic material, a pair of stator members positioned within said frame member and disposed in tandem relationship, each stator member consisting of an annular energizing coil and a pair of pole piece structures positioned respectively to either end of said coil in magnetic association therewith, each pole piece structure being formed from a plurality of thin flat laminations of magnetic material having a yoke portion and pole portions at the extremities thereof extending transversely thereto, said laminations of each field structure being assembled in a plurality of pairs such that the yoke portions of a pair of laminations lie in substantially the same plane engaging at their periphery said frame member and with the pole portions thereon disposed adjacent one another and in parallel relationship to form a plurality of poles common to one end of said coil and extending in the same direction toward the opposite stator member with the pole portions being interposed equidistantly between poles formed by the pole portions of the field structure common to the opposite end surface of the same coil, a slotted support member of non-magnetic material positioned within said frame member and between said stators receiving the poles formed by the pole piece portions of the laminations of the field structures of each stator positioning the same with a cylindrical opening therebetween and with the poles from one stator member interposed between the poles from the opposite stator member, and means for mounting a rotor member on said frame member for rotation of said rotor member within said cylindrical opening in magnetic association therewith.

4. In an alternating current motor, a cylindrical frame member of magnetic material, a pair of stator members positioned within said frame member and disposed in tandem relationship, each stator member consisting of an annular energizing coil and a pair of pole piece structures positioned respectively to either end of said coil in magnetic association therewith, each pole piece structure being formed of an even number of identical flat laminations having a pole portion and a pair of pole piece portions bent normal thereto, said laminations of each field structure being assembled in a plurality of pairs such that the yoke portions of a pair of laminations lie in substantially the same plane engaging at their outer periphery said cylindrical frame member and with the pole piece portions disposed adjacent one another in parallel relationship to form a pair of poles common to one end of said coil, said poles extending in the same direction interposed equi-distantly between poles formed by the pole piece portions of the laminations of the field structures common to the opposite end surface of said coil of the stator with the poles common to one end surface of said coil extending through the aperture in said coil, a slotted support member of non-magnetic material positioned within said frame member and between said stator members receiving the poles formed by the pole piece portions of the laminations of the field structures of each stator member positioning the same with a cylindrical opening therebetween and with the poles from one stator member interposed between the poles from the opposite stator member, and means for mounting a rotor member on said frame member for rotation of said rotor member within said cylindrical opening in magnetic association therewith.

5. A laminated magnetic field element which comprises a plurality of thin flat laminations of magnetic material, each lamination having a yoke portion and pole piece portions at the extremities thereof bent normal thereto, a magnetic frame member housing said laminations, said laminations being assembled in groups in which the individual laminations for each group are substantially identical to one another and are nested one beside the other with more than one group forming a yoke from which a plurality of poles extend normal thereto and each pole being formed from the pole piece portions at one extremity of each of two groups of laminations, an energizing coil for said field element positioned between two yokes formed by groups of laminations, said laminations of said yokes being so positioned that the poles thereon terminate to one side of one yoke remote from said coil in defining a cylindrical opening therebetween, and a slotted non-magnetic support member having a cylindrical opening therein coinciding with said opening defined by said poles and encircling said poles with said slots receiving said poles for positioning the same.

6. A laminated magnetic field element which comprises a plurality of thin flat laminations of magnetic material, each lamination having a yoke portion and pole piece portions at the extremity thereof extending normal thereto, a magnetic frame member housing said laminations, said laminations being assembled in groups in which the individual laminations for each group are substantially identical to one another and are nested one within the other with two groups forming a yoke from which a pair of poles extend normal thereto and in the same direction with each pole being formed from the pole piece portions at one extremity of each of the two groups of laminations, a single energizing coil for said field element positioned between two yokes formed by the groups of laminations, said laminations of said yokes being so positioned that the poles thereon extend in the same direction and terminate to one side of one yoke remote from said coil defining a cylindrical opening therebetween, and a non-magnetic support member having a cylindrical opening therein concentric with said opening defined by said poles and with slots extending radially from said cylindrical opening in which are positioned said poles to be supported thereby, said support member being positioned within said magnetic frame member.

7. A laminated magnetic field element which comprises a plurality of thin flat laminations of magnetic material, each lamination having a yoke portion and pole piece portions at the extremities thereof bent normal thereto, a magnetic frame member housing said laminations, said laminations being assembled in groups in which the individual laminations for each group are substantially identical to one another and are nested one beside the other with more than one group forming a yoke in magnetic association with said magnetic frame member from which a plurality of poles extend normal thereto and each pole being formed from the pole piece portions at one extremity of each of two groups of laminations, an energizing coil for said field element positioned between two yokes formed by groups of laminations, said laminations of said yokes being so positioned that the poles thereon terminate to one side of one yoke remote from said coil in defining a cylindrical opening therebetween, and a slotted non-magnetic support member having a cylindrical opening therein coinciding with said opening defined by said poles and encircling said poles with said slots receiving said poles for positioning the same.

8. A laminated magnetic field element which comprises a plurality of thin flat laminations of magnetic material, each lamination having a yoke portion and pole piece portions at the extremities thereof bent normal thereto, a magnetic frame member housing said laminations, said laminations being assembled in groups in which the individual laminations for each group are substantially identical to one another and are nested one beside the other with more than one group forming a yoke engaging at its periphery said magnetic frame member from which a plurality of poles extend normal thereto and each pole being formed from the pole piece portions at one extremity of each of two groups of laminations, an energizing coil for said field element positioned between two yokes formed by groups of laminations, said laminations of said yokes being so positioned that the poles thereon terminate to one side of one yoke remote from said coil and defining a cylindrical opening therebetween, and a slotted non-magnetic support member having a cylindrical opening therein coinciding with said opening defined by said poles and encircling said poles with said slots receiving said poles for positioning the same.

9. A laminated magnetic field element which comprises a plurality of thin flat laminations of magnetic material, each lamination having a yoke portion and pole piece portions at the extremities thereof bent normal thereto, a magnetic frame member housing said laminations, said laminations being assembled in groups in which the individual laminations for each group are substantially identical to one another and are nested one beside the other with more than one group forming a yoke enaging at its periphery said magnetic frame member from which a plurality of poles extend normal thereto and each pole being formed from the pole piece portions at one extremity of each of two groups of laminations, said pole piece portions of said laminations for each group being slightly curved along their extremity so that when nested the pole piece portions contact one another, an energizing coil for said field element positioned between two yokes formed by groups of laminations, said laminations of said yokes being so positioned that the poles thereon terminate to one side of one yoke remote from said coil in defining a cylindrical opening therebetween, and a slotted non-magnetic support member having a cylindrical opening therein coinciding with said opening defined by said poles and encircling said poles with said slots receiving said poles for positioning the same.

10. A laminated magnetic field element which comprises a plurality of thin flat laminations of magnetic material, each lamination having a yoke portion and pole piece portions at the extremities thereof bent normal thereto, a magnetic frame member housing said laminations, said laminations being assembled in groups in which the individual laminations for each group are substantially identical to one another and are nested one beside the other with more than one group forming a yoke engaging at its periphery said magnetic frame member from which a plurality of poles extend normal thereto and each pole being formed from the pole piece portions at one extremity of each of two groups of laminations, said pole piece portions of said laminations for each group being slightly curved along their extremity so that when nested the pole piece portions contact one another, an energizing coil for said field element positioned between two yokes formed by groups of laminations, said laminations of said yokes being so positioned that the poles thereon extend in the same direction and terminate to one side of one yoke remote from said coil and with said poles from one of said yokes extending through said coil defining a cylindrical opening therebetween, and a slotted non-magnetic support member having a cylindrical opening therein coinciding with said opening defined by said poles and encircling said poles with said slots receiving said poles for positioning the same.

11. A laminated magnetic field element which comprises a plurality of thin flat laminations of magnetic material, each lamination having a yoke portion and pole piece portions at the extremity thereof bent normal thereto, a magnetic frame member for housing said laminations, said laminations being assembled in groups in which the individual laminations from each group are substantially identical to one another and are nested one within the other with more than one group forming a yoke in magnetic association with said frame member from which a plurality of poles extend normal thereto and in the same direction and with each pole being formed from the pole piece portions at a common extremity of each of two groups of laminations, said pole piece portions being slightly curved along their extent so that when nested the pole piece portions contact one another, said laminations of said yokes being so positioned that the poles thereon terminate to one side of one of said yokes remote from said coil and with the poles from one of said yokes extending through said coil defining an opening therebetween, and a non-magnetic support member positioned in said magnetic frame member and having an opening therein concentric with said opening defined by said poles and with slots extending radially from said opening in which are positioned said poles to be supported by said magnetic support member.

12. In a field structure for an electric motor, a first laminated magnetic field element comprising a plurality of thin flat laminations of magnetic material, each lamination having a yoke portion and pole piece portions at the extremity thereof bent normal thereto, a magnetic frame member for housing said field element, said laminations being assembled in groups in which the individual laminations for each group are substantially identical to one another and are nested one within the other with one group forming a yoke from which a plurality of poles extend normal thereto with each pole being formed from the pole piece portions at a common extremity of each of two groups of laminations, an energizing coil for said field element positioned between two yokes formed by groups of laminations, said laminations of said yokes being so positioned that the poles thereon extend in the same direction and terminate to one side of one yoke remote from said coil defining a cylindrical opening therebetween, a second field element identical to the first yield element and positioned in said magnetic frame member, said second field element being so positioned that its poles extend toward said first field element and are spaced midway between the poles of said first named field element, and a slotted non-magnetic support member positioned between said field elements and within said magnetic frame having a cylindrical opening therein concentric with said opening defined by said poles and encircling said poles with said slots receiving said poles for supporting same.

JOSEPH T. ABDO.

References Cited in the file of this patent

UNITED STATES PATENTS

| Number | Name | Date |
|---|---|---|
| 267,196 | Harling | Nov. 7, 1882 |
| 630,333 | Dietrich | Aug. 8, 1899 |
| 1,255,606 | Hensley | Feb. 5, 1918 |
| 2,070,447 | Morrill | Feb. 9, 1937 |
| 2,243,318 | Rawlings | May 27, 1941 |
| 2,405,012 | Bousky | July 30, 1946 |

FOREIGN PATENTS

| Number | Country | Date |
|---|---|---|
| 629,684 | Great Britain | Sept. 26, 1949 |